Patented June 7, 1927.

1,631,468

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ACETATE COMPOSITION OF LOW INFLAMMABILITY.

No Drawing.   Application filed April 27, 1925.   Serial No. 26,309.

This invention relates to cellulose acetate compositions of low inflammability. One object of the invention is to provide a cellulose acetate composition the inflammability of which is reduced to an important extent so that it becomes relatively safe, even in the film, lacquer and plastic arts. Another object is to provide a composition which may be made into transparent, strong, flexible films that are substantially waterproof, are unaffected by ordinary photographic baths, combine low inflammability with practical freedom from color and possess, in short, the desired properties of a support for sensitive photographic coatings. Still another object of my invention is to produce a composition which may be used in film, varnish or plastic manufacturing without injury to or being injured by the substances with which it is associated during manufacture, storage or use. Further objects will hereinafter appear.

I have found that cellulose acetate compositions having the desirable qualities enumerated above can be obtained by mixing cellulose acetate, preferably of the acetone-soluble type, with a brom-nucleo-substitution product of the phenols and their homologues, said mixture being effectively neutral and said substitution product being substantially free from uncombined bromine and hydrobromic acid. By effectively neutral I mean that there is not present in the mixture a high enough concentration of acid to break down or liberate bromine from the substitution product. I may employ any one or more of the brominated monohydric and polyhydric phenols and their homologues, such as carbolic acid, catechol, resorcinol, hydrochinone, pyrogallol, phloroglucinol, cresol, thymol, etc., provided that the one or more bromine atoms are joined directly to a carbon in the ring. I prefer, at present, to use tribromophenol, parabromophenol and bromohydrochinone, but it will be understood that my invention is not restricted to these individual substances, except as indicated in the appended claims.

Compositions of cellulose acetate and such brom substitution products have a surprising degree of practical non-inflammability,—that is, an unexpected slowing down of the propagation of combustion therein. Films of such compositions, when ignited, often go out and must be reignited several times during the test, the flame traveling along the film very slowly.

Unless certain precautions are taken, films embodying such compositions may become discolored beyond the manufacturing tolerance which is permissible. The first precaution is to free the brom substitution product from free bromine and free hydrobromic acid. The other precaution is to keep the mixture effective neutral so that there will be insufficient acid to split up the substitution products. I consider films resulting from these precautions to be colorless when they fall within the customary manufacturing tolerances as regards color.

In one form of my invention I may dissolve 100 parts by weight of acetone-soluble cellulose acetate in 300 to 500 parts of acetone, along with 5 to 75 parts of tribromophenol. Such a composition, say one containing 400 parts of acetone and 30 parts of tribromophenol to 100 parts of cellulose acetate, is suitable for manufacturing film by the usual methods.

In another illustrative embodiment of my invention I may dissolve 100 parts of cellulose acetate in 300 to 500 (say 400) parts of acetone and 5 to 50 (say 30) parts of para-bromophenol. This is likewise suitable for film manufacture.

In still a different form of my invention I can combine 100 parts of cellulose acetate with 5 to 50 (say 30) parts of bromohydrochinone by dissolving them in 300 to 500 (say 400) parts of acetone.

The ingredients are mixed thoroughly to form a homogeneous soloution or flowable mass which is filtered if desired. When more flowable solutions are desired, or when the compositions are to be employed as lacquers, the volatile solvent may be increased, as will be understood by those skilled in the art, or volatile non-solvents, such as benzol, alcohol, and the like may be added, but not to the point where precipitation occurs. Along with the ingredients given in the above examples, I may add one or more organic bodies of only slight volatility which enhance the plasticity or flexibility of the compositions, and regulate the preparation of film therefrom; but such bodies are not preferred or essential. Examples of them are amyl or butyl acetate, the various amyl alcohols, the various butyl alcohols, and mixtures of them.

Films prepared from the hereinabove described compositions are flexible, smooth, transparent and suitable for photographic purposes. Moreover, the absence of free bromine and free hydrobromic acid, initially and throughout the useful life of the films, prevents injury to any photographic coatings or discoloration of the composition. Of course, a small amount of a substance which absorbs bromine (like dicyandiamine) and blends with the other ingredients of the film without injuring the photographic coatings my be incorporated in the compositions as an insurance against trouble, but this is unnecessary when the composition is prepared with reasonable care while observing the precautions hereinafter set forth.

Having thus described my invention, what I claim as new and desire to secure by Letters Patent is:

1. An effective neutral composition of matter comprising cellulose acetate, and at least one of the brom-nucleo-substitution products of the phenols and their homologues which is substantially free from uncombined bromine and hydrobromic acid.

2. An effectively neutral composition comprising cellulose acetate, at least one of the brom-nucleo-substitution products of the phenols and their homologues which is substantially free from uncombined bromine and hydrobromic acid and a solvent common to said ingredients.

3. A flowable film-forming composition comprising cellulose acetate, at least one of the brom-nucleo-substitution products of the phenols and their homologues which is substantially free from uncombined bromine and hydrobromic acid, an organic body of only slight volatility that enhances the flexibility of the films, and a volatile solvent common to all said ingredients.

4. A composition of matter which is effectively neutral and substantially colorless and comprises acetone-soluble cellulose acetate, at least one of the brom-nucleo-substitution products of monohydric phenols and their homologues which is substantially free from uncombined bromine and hydrobromic acid.

5. An effectively neutral and colorless composition comprising cellulose acetate and tribromophenol substantially free from uncombined bromine and hydrobromic acid.

6. A flowable film-forming composition which is effectively neutral and colorless comprising acetone-soluble cellulose acetate, tribromophenol substantially free from uncombined bromine and hydrobromic acid and a solvent common to said ingredients.

7. As an article of manufacture a flexible, transparent, substantially colorless film comprising cellulose acetate and at least one of the brom-nucleo-substitution products of the phenols and their homologues substantially free from uncombined bromine and hydrobromic acid.

8. A flexible, transparent, substantially colorless film which is substantially inert toward photographic coatings, which comprises acetone-soluble cellulose acetate, and at least one of the brom-nucleo-substitution products of monohydric phenols and their homologues which is substantially free from uncombined bromine and hydrobromic acid.

9. As an article of manufacture, a substantially colorless flowed film, which is substantially inert toward photographic coatings which comprises acetone-soluble cellulose acetate and tribromophenol which is substantially free from uncombined bromine and hydrobromic acid.

Signed at Rochester, New York, this 25th day of April, 1925.

STEWART J. CARROLL.